(12) United States Patent
Tanaka et al.

(10) Patent No.: US 11,585,959 B2
(45) Date of Patent: Feb. 21, 2023

(54) OPTICAL SENSOR

(71) Applicant: CANON KABUSHIKI KAISHA, Tokyo (JP)

(72) Inventors: Shunsuke Tanaka, Yokohama (JP); Norikazu Sugiyama, Susono (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 100 days.

(21) Appl. No.: 16/935,443

(22) Filed: Jul. 22, 2020

(65) Prior Publication Data
US 2021/0063602 A1 Mar. 4, 2021

(30) Foreign Application Priority Data

Aug. 29, 2019 (JP) .............................. JP2019-156386

(51) Int. Cl.
*G01V 8/12* (2006.01)
(52) U.S. Cl.
CPC ...................................... *G01V 8/12* (2013.01)
(58) Field of Classification Search
CPC ... G01V 8/12; G01V 3/18; G01V 8/00; G01V 8/10; G01V 8/22
See application file for complete search history.

(56) References Cited

U.S. PATENT DOCUMENTS

| 9,307,634 B2 | 4/2016 | Sugiyama |
| 10,671,009 B2 | 6/2020 | Minobe |
| 10,714,885 B2 | 7/2020 | Sugiyama |
| 2006/0243990 A1* | 11/2006 | Suzuki ................. H01L 25/167 257/E25.032 |
| 2008/0210952 A1* | 9/2008 | Wada ................. H01L 31/0203 257/E31.118 |
| 2016/0187530 A1* | 6/2016 | Ma ........................ H01L 25/167 257/82 |
| 2020/0257234 A1 | 8/2020 | Minobe |

FOREIGN PATENT DOCUMENTS

| CN | 1901235 A | * | 1/2007 | ............. G01V 8/12 |
| CN | 103579216 A | * | 2/2014 | ............. G01V 8/12 |
| CN | 106066495 A | * | 11/2016 | ............. G01S 17/04 |
| DE | 10121185 B4 | * | 4/2013 | ............. G01V 8/10 |
| JP | 11274550 A | * | 10/1999 | |
| JP | H11-274550 | | 10/1999 | |
| JP | H11274550 A | * | 10/1999 | |
| JP | 2007059657 A | * | 3/2007 | |
| JP | 2007109851 A | * | 4/2007 | |
| JP | 2014192308 A | * | 10/2014 | ............. H01L 24/97 |
| JP | 6130456 B2 | * | 5/2017 | ........... G01S 17/026 |
| JP | 6236130 B2 | * | 11/2017 | ........... H01L 25/167 |
| KR | 20090093621 A | * | 9/2009 | |
| KR | 20100006905 A | * | 1/2010 | |
| WO | WO-2009152820 A2 | * | 12/2009 | ............. G01V 8/10 |

* cited by examiner

*Primary Examiner* — Michael P Stafira
(74) *Attorney, Agent, or Firm* — Venable LLP

(57) ABSTRACT

An optical sensor includes a substrate, a light emitting element, a light receiving element, and an electronic circuit element. Light from the light emitting element is blocked by a detection object to detect the detection object. The light emitting element, the electronic circuit element and the light receiving element are mounted on the same surface of the substrate. The electronic circuit element is disposed between the light emitting element and the light receiving element on a mounting surface of the substrate.

7 Claims, 7 Drawing Sheets

(a)

(b)

OPTICAL SENSOR

FIELD OF THE INVENTION AND RELATED ART

The present invention relates to an optical sensor for detecting a detection object (object to be detected) by using a light emitting element and a light receiving element.

A transmitting type photo-interrupter as a conventional optical sensor uses the light emitting element such as an LED and the light receiving element such as a phototransistor and detects that light is blocked when the detection object passes through between the light emitting element and the light receiving element, so that detection of the detection object is carried out.

For example, in the transmitting type photo-interrupter, a light emitting element of a surface mounting type and a light receiving element of a surface mounting type are mounted on the same surface of a substrate, and a casing including inner reflecting surfaces is assembled with the substrate on which these elements are mounted (Japanese Laid-Open Patent Application (JP-A) Hei 11-274550). Further, a constitution in which the light emitted from the light emitting element in a perpendicular direction is reflected two times by reflecting surfaces of a casing and enters the light receiving element in the perpendicular direction is employed.

In such an optical sensor, it is also possible to realize a constitution in which the casing assembled later with the substrate on which the light emitting element and the light receiving element are mounted is replaced from the casing provided with the above-described inner reflecting surfaces with a light guide made of a transparent resin material. In this case, the light emitted from the light emitting element is guided by the light guide and then enters the light receiving element in the perpendicular direction through inner surface reflection.

However, in the case where the casing provided with the inner reflecting surfaces is assembled later with the substrate on which the light emitting element and the light receiving element are mounted, in order to guide the light from the light emitting element to the light receiving element, there is a need to effect appropriate positioning of the reflecting surfaces. For that reason, between the light emitting element and the light receiving element, a gap is formed between the substrate and the casing. In this case, the light from the light emitting element enters in directly the light receiving element through reflection by the reflecting surfaces, and in addition thereto, enters directly the light receiving element through the above-described gap. That is, the light receiving element is influenced by the light which directly enters the light receiving element through the gap, so that there was a problem such that portion of the detection object cannot be properly detected.

Further, in the case where the casing assembled later is replaced with the light guide made of the transparent resin material, the light guide is made of the transparent resin, and therefore, the light from the light emitting element directly enters the light receiving element, so that there was a problem such that presence or absence of the detection object cannot be properly detected.

SUMMARY OF THE INVENTION

A principal object of the present invention is to provide an optical sensor which is capable of properly detecting a detection object without being influenced by light directly entering a light receiving element from a light emitting element and which employs an inexpensive and simple constitution.

According to an aspect of the present invention, there is provided an optical sensor comprising: a substrate; a light emitting element configured to emit light; a light receiving element configured to receive the light from the light emitting element through a space where a detection object passes; and an electronic circuit element, wherein the light from the light emitting element is blocked by the detection object to detect the detection object, wherein the light emitting element, the electronic circuit element and the light receiving element are mounted on the same surface of the substrate, and wherein the electronic circuit element is disposed between the light emitting element and the light receiving element on a mounting surface of the substrate.

Further features of the present invention will become apparent from the following description of exemplary embodiments with reference to the attached drawings.

BRIEF DESCRIPTION OF THE DRAWINGS

Part (a) of FIG. 1 is a perspective view of an optical sensor in an embodiment 1, and part (b) of FIG. 1 is a top plan view of the optical sensor in the embodiment 1.

Figure 3:
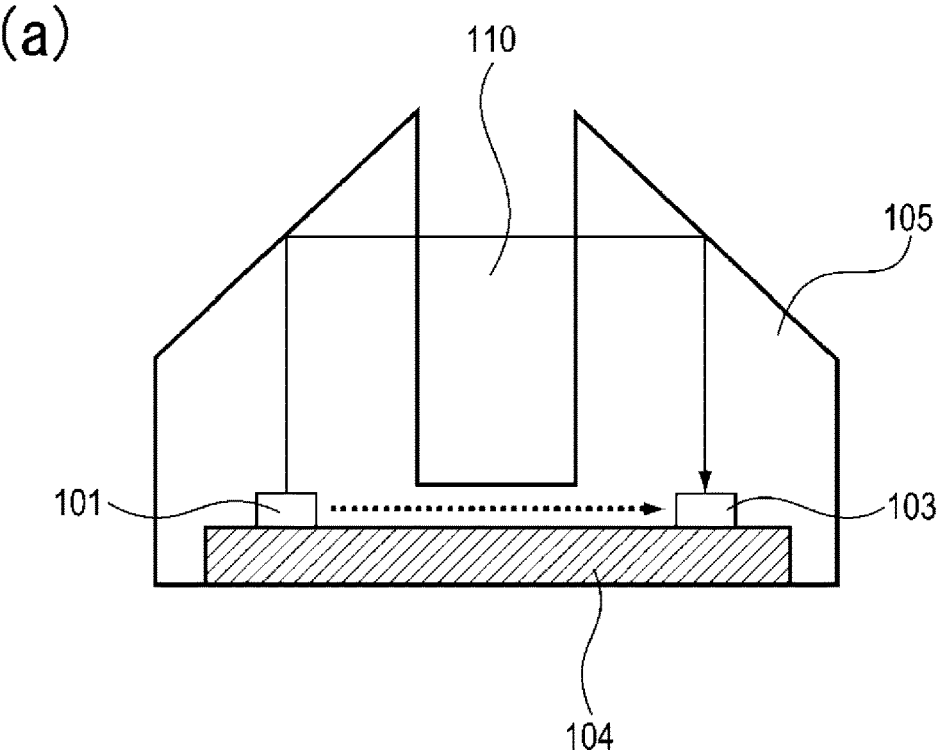
Figure 3:
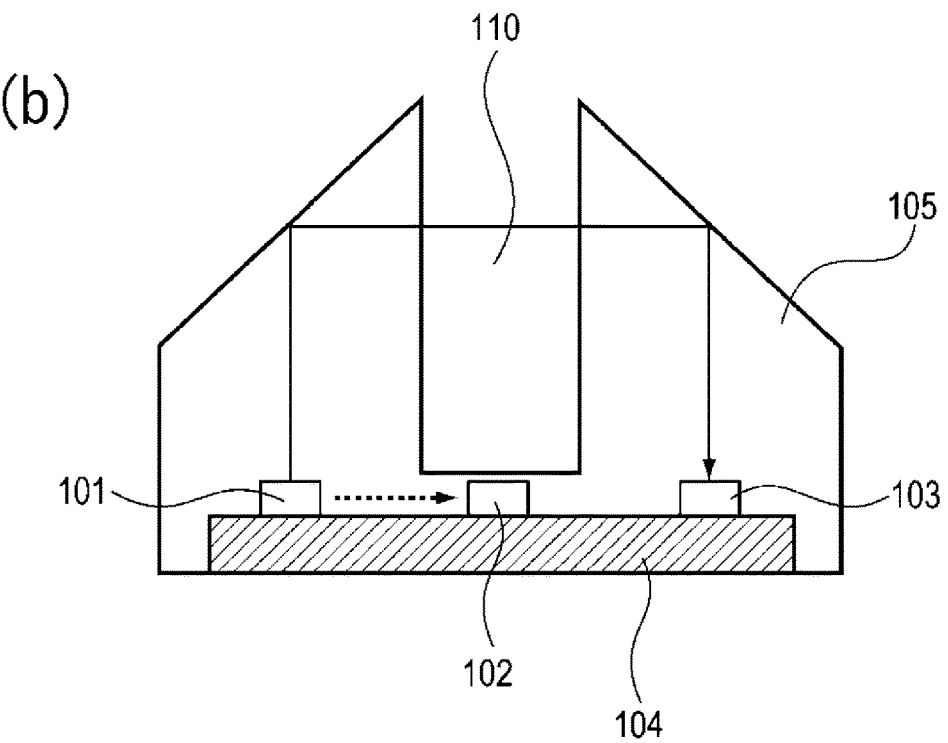

Part (a) of FIG. 3 is a sectional view of an optical sensor in a comparison example, and part (b) of FIG. 3 is a sectional view of the optical sensor in the embodiment 1.

Figure 4:
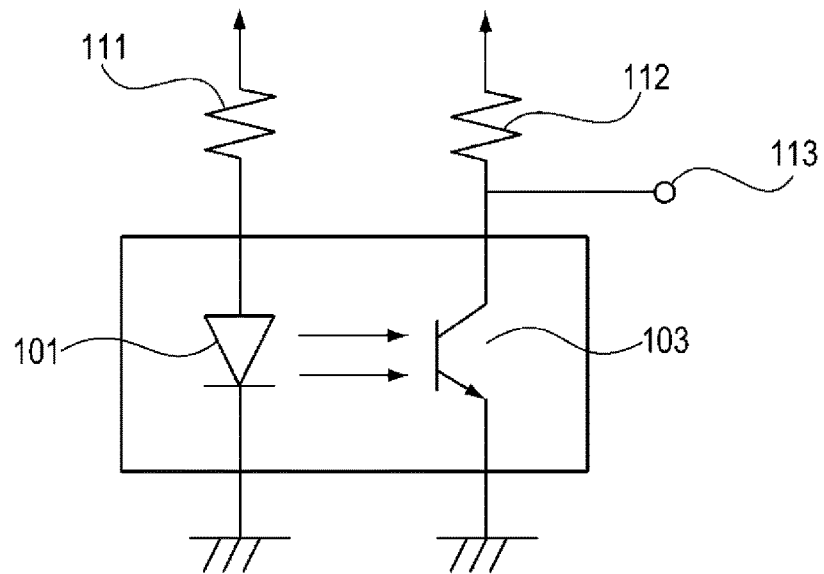

FIG. 4 is a circuit view showing an equivalent circuit of the optical sensor in the embodiment 1.

Figure 5:
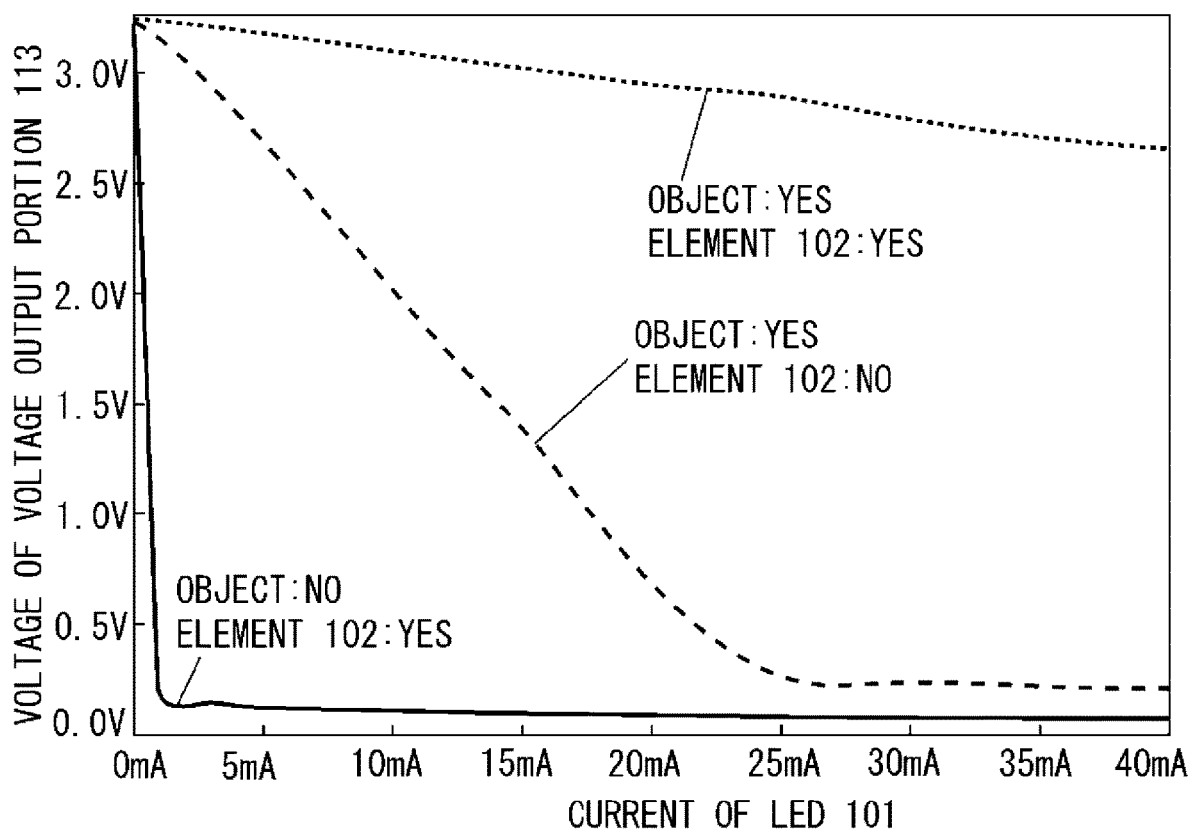

FIG. 5 is a graph showing an output characteristic of the optical sensor in the embodiment 1.

Figure 6:
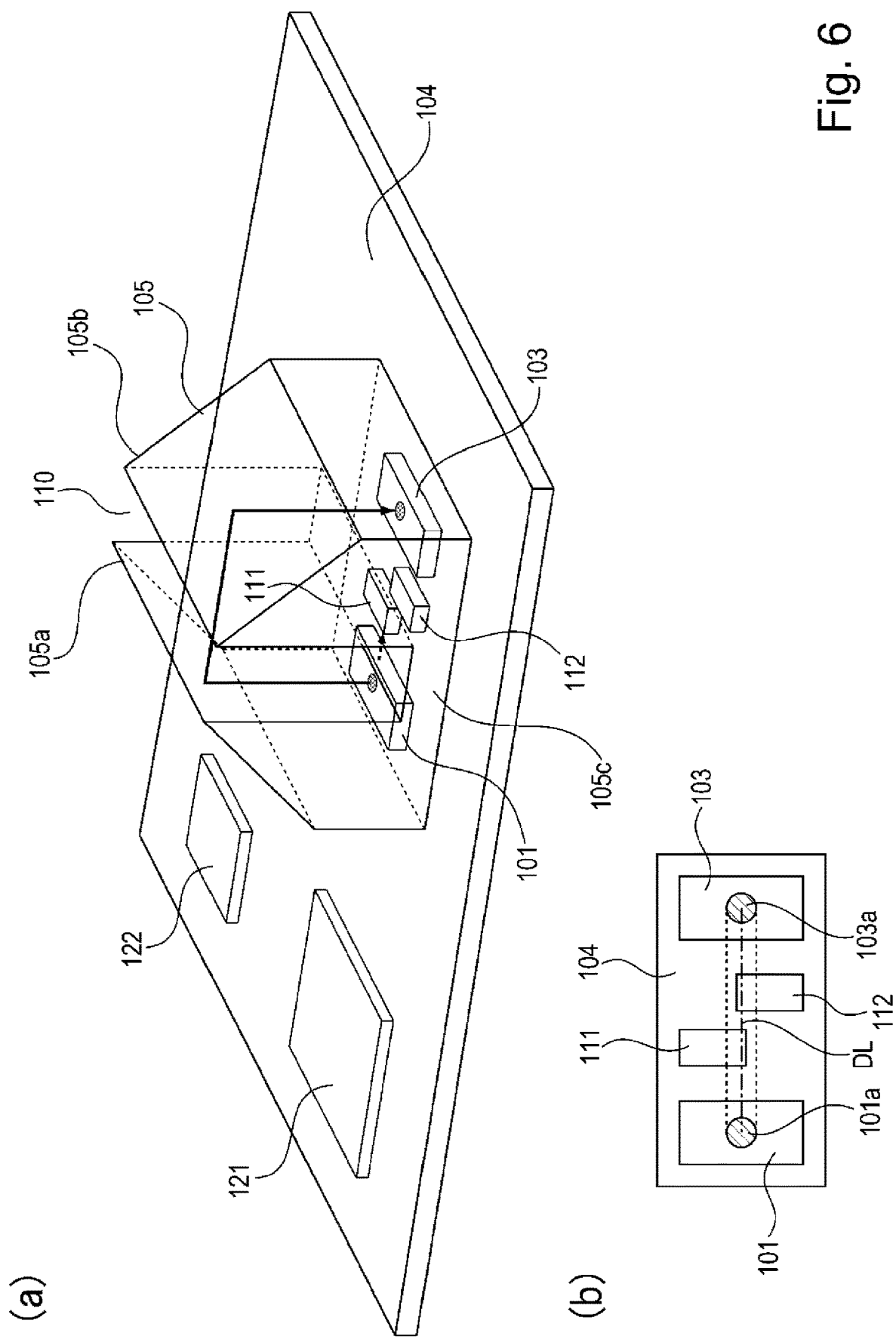

Part (a) of FIG. 6 is a perspective view of an optical sensor in an embodiment 2, and part (b) of FIG. 6 is a top plan view of the optical sensor in the embodiment 2.

Figure 7:
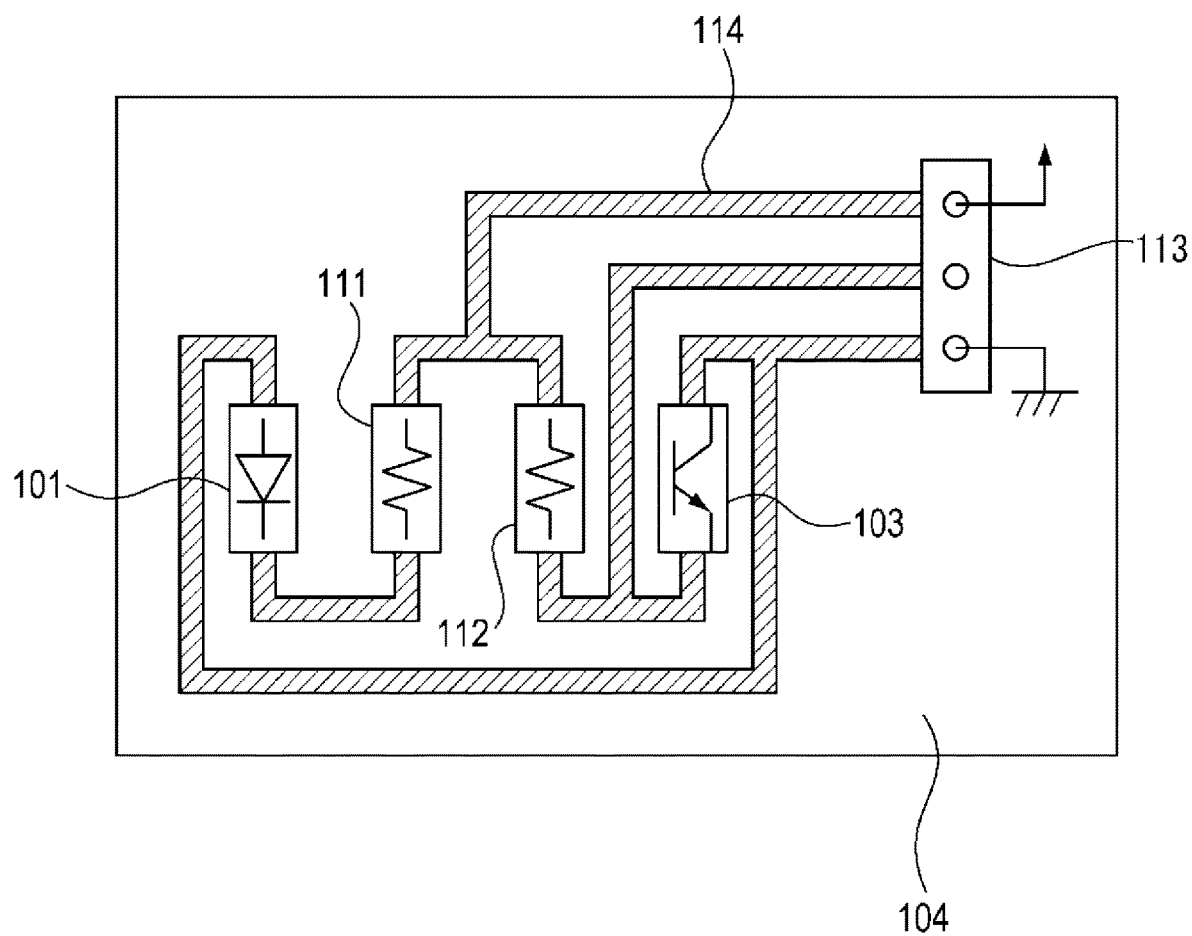

FIG. 7 is a schematic view showing a layout of component parts of the optical sensor in the embodiment 2.

Figure 8:
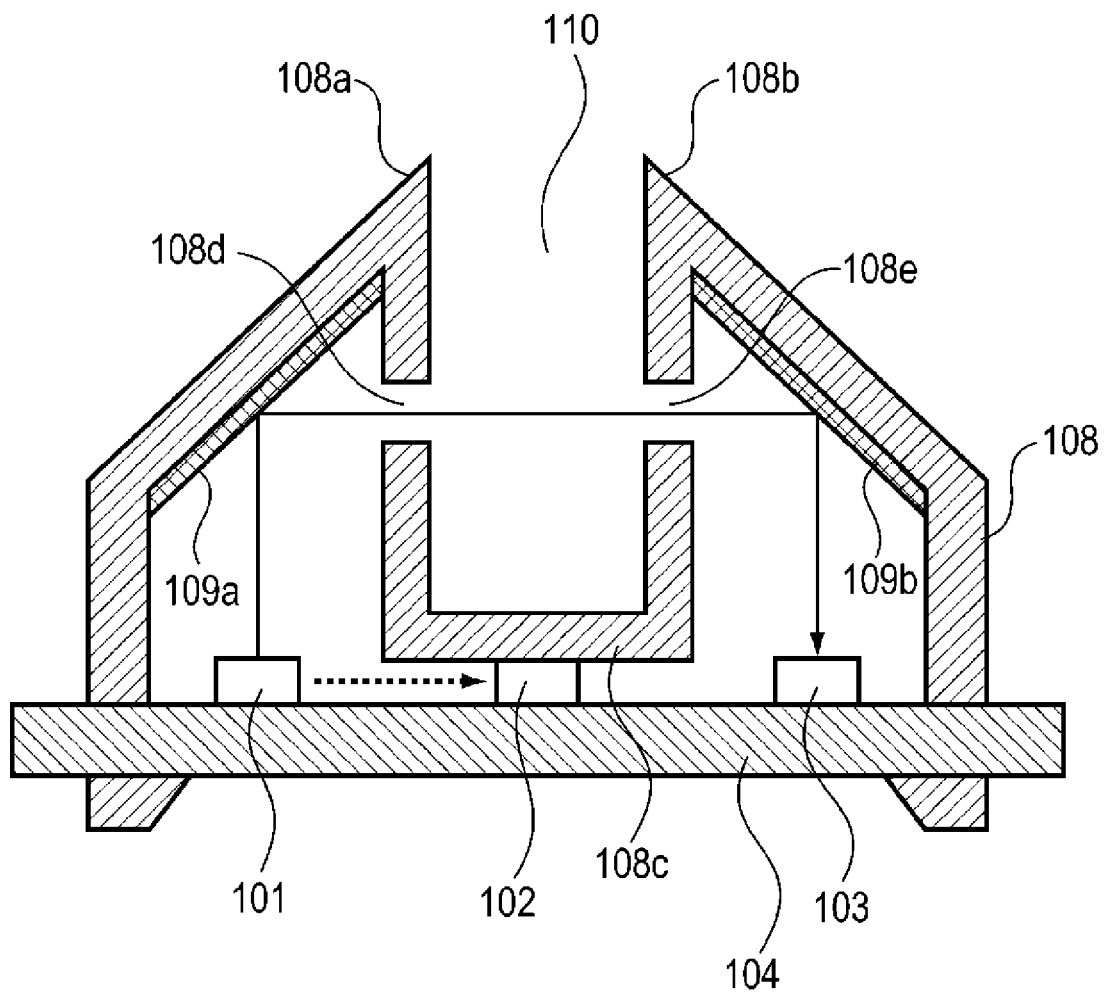

FIG. 8 is a sectional view of an optical sensor in an embodiment 3.

DESCRIPTION OF EMBODIMENTS

Embodiments of the present invention will be specifically described with reference to the drawings. Dimensions, materials, shapes and relative arrangement of constituent elements described in the following embodiments should be appropriately be changed depending on structures and various conditions of optical sensor to which the present invention is applied, and the scope of the present invention is not intended to be limited thereto.

Embodiment 1

Figure 1:
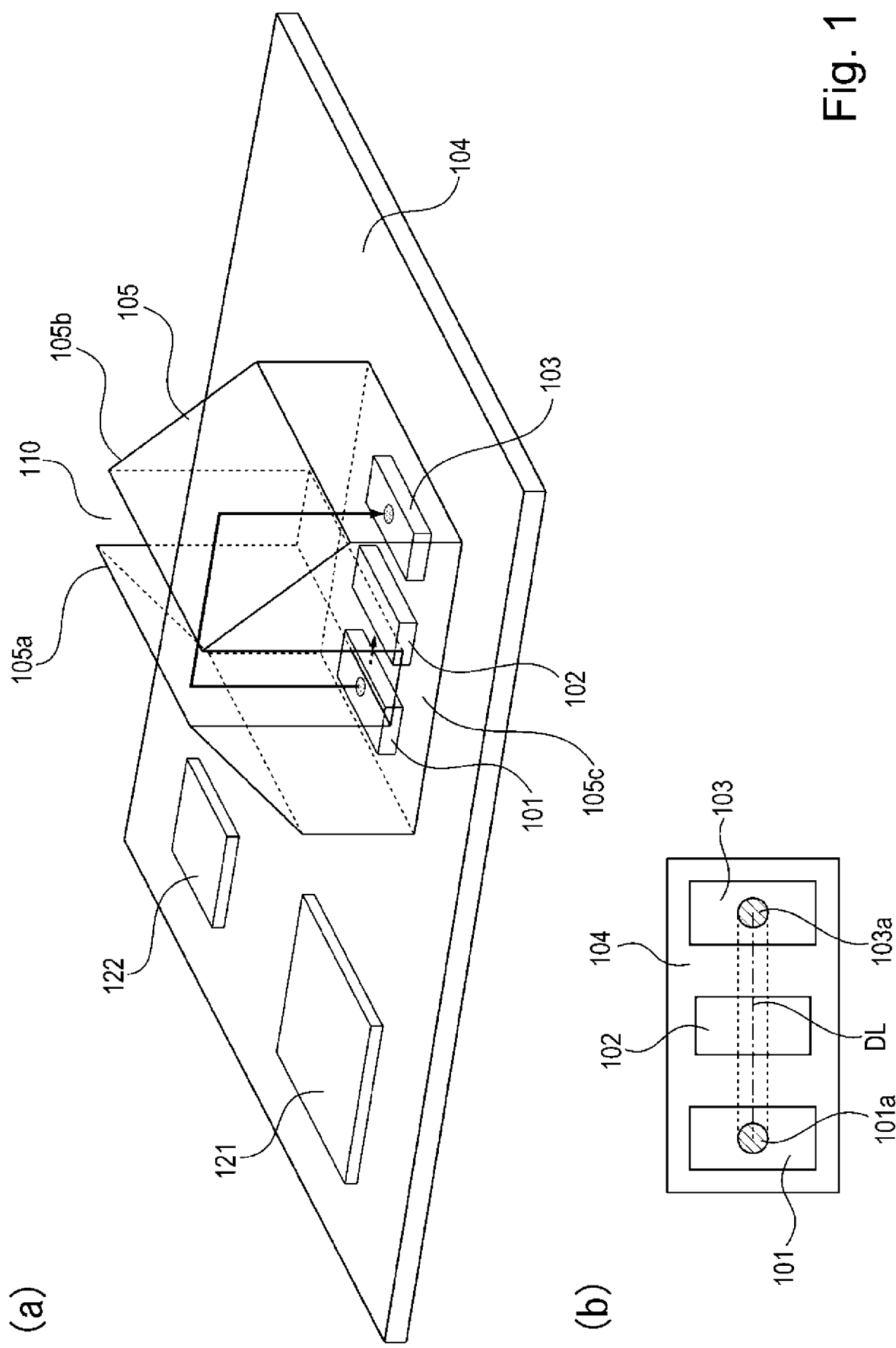

An optical sensor according to an embodiment 1 of the present invention will be described using FIG. 1. Part (a) of FIG. 1 is a perspective view of the optical sensor in the embodiment 1, and part (b) of FIG. 1 is a top plan view of the optical sensor in the embodiment 1.

An optical sensor 100 according to the embodiment 1 includes a light emitting element 101 for emitting light, a light receiving element 103 for receiving the light from the light emitting element 101 through a space 110 in which a detection object (object to be detected) 106 (FIG. 2) passes, and an electronic circuit element 102. The optical sensor 100 detects the detection object 106 in such a manner that the light from the light emitting element 101 is blocked by the detection object 106 in the space 110 and thus an amount of the light received by the light receiving element 103 changes.

The light emitting element 101 includes a light emitting source 101a. In this embodiment, as the light emitting element 101, an LED of a surface mounting type is used. The light emitting element 101 is the LED of a vertical optical axis type in which the light is emitted toward a substrate 104 in a perpendicular direction. The light receiving element 103 includes a light receiving region 103a. In this embodiment, as the light receiving element 103, a phototransistor (Ptr) is used. The light receiving element 103 is the phototransistor of a vertical optical axis type in which the light traveling toward the substrate 104 is received.

On the substrate 104, in addition to the light emitting element 101 and the light receiving element 103 which constitute a photo-interrupter of a (light) transmission type, the electronic circuit element 102, a CPU 121 and a memory 122 are mounted on the same surface (plane). The electronic circuit element 102 is provided between the light emitting element 101 and the light receiving element 103 on a mounting surface of the substrate 104. The light emitting element 101 and the light receiving element 103 which constitute the photo-interrupter which is the optical sensor are reflow-mounted on the substrate 104 together with other component parts such as the above-described electronic circuit element 102. That is, the electronic circuit element 102 is a reflow mountable element (component part) and is mounted on the same surface of the substrate 104 in combination with the light emitting element 101 and the light receiving element 103 by an automatic mounting device (not shown) for mounting the elements in predetermined positions of the substrate 104.

The electronic circuit element 102 is disposed between the light emitting element 101 and the light receiving element 103 on the mounting surface of the substrate 104. The electronic circuit element 102 is disposed on a line DL connecting a center of the light emitting source 101a of the light emitting element 101 and a center of the light receiving region 103a of the light receiving element 103. In this embodiment, as the electronic circuit element 102, a chip resistor which is not electronically connected to the light emitting element 101 and the light receiving element 103 which are mounted on the substrate 104 is used. Further, the chip resistor used as the electronic circuit element 102 has the same size as the LED used as the light emitting element 101.

The optical sensor 100 includes a light guide 105 as a light guiding member. The light guide 105 is mounted later on the substrate 104 on which the light emitting element 101, the electronic circuit element 102 and the light receiving element 103 has been reflow mounted. The light guide 105 is made of an acrylic resin material and guides the light, emitted in the perpendicular direction from the light emitting element 101, toward the light emitting element 103 in the perpendicular direction by inner surface reflection of inclined surface portions. Specifically, the light guide 105 is prepared by integrally forming a first light guiding portion 105a, a second light guiding portion 105b and a connecting portion 105c connecting the first light guiding portion 105a and the second light guiding portion 105b. The first light guiding portion 105a guides the light, emitted from the light emitting element 101, into a direction in which the light passes through a space 110. The second light guiding portion 105b is provided opposed to the first light guiding portion 105a through the space 110 and guides the light, passed through the space 110, to the light receiving element 103. The connecting portion 105c is hollow on a mounting surface side of the substrate 104. On the mounting surface of the substrate 104, the electronic circuit element 102 is disposed between the light emitting element 101 and the light receiving element 103 at a position corresponding to the connecting portion 105c of the light guide 105 on the substrate 104.

Figure 2:
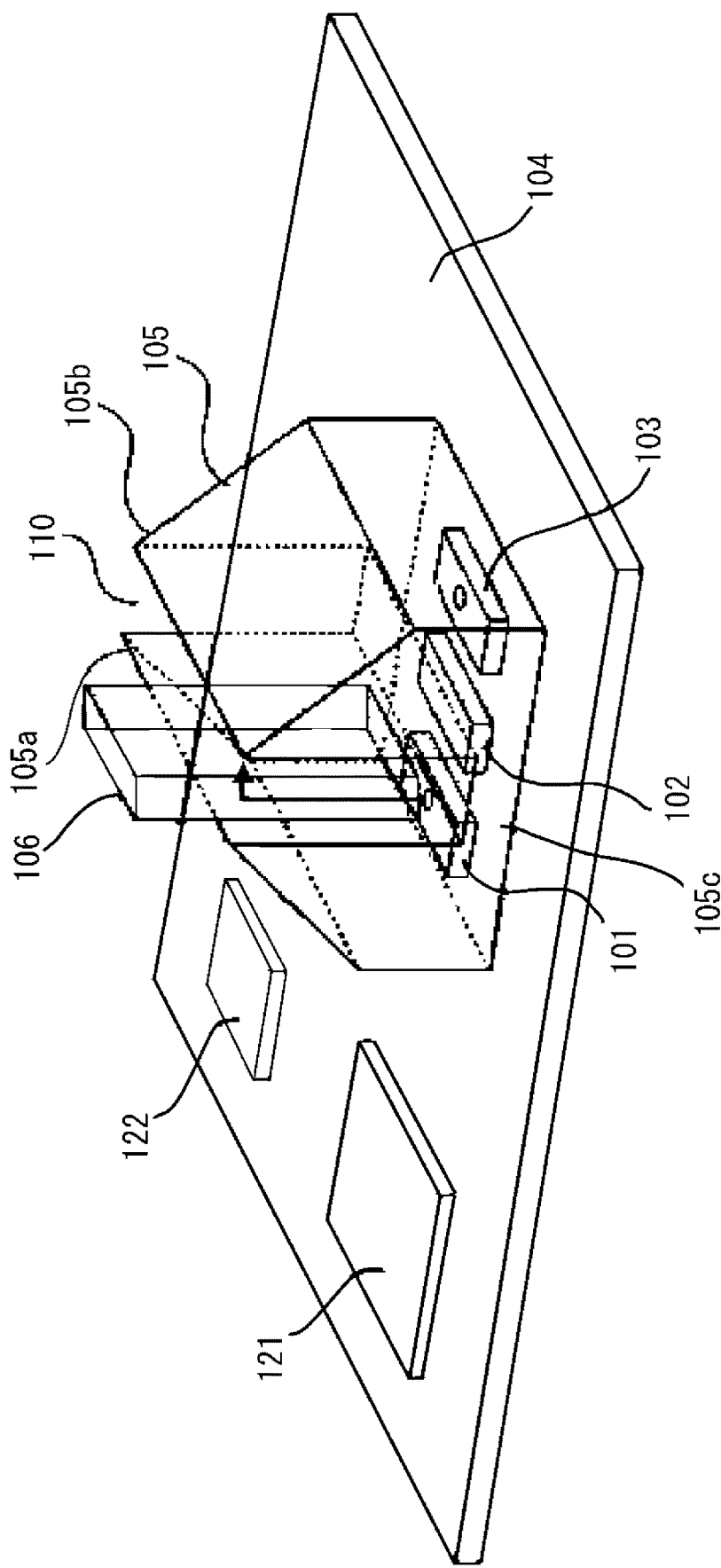
FIG. 2 is a perspective view of the optical sensor in the embodiment 1.

The space 110 is formed between the first light guiding portion 105a and the second light guiding portion 105b which are provided opposed to each other and is positioned on an optical path along which the light emitted from the light emitting element 101 in the perpendicular direction is guided to the light receiving element 103. When the detection object 106 is in this space 110, the optical path is blocked, and therefore, the light emitted from the light emitting element 101 does not reach the light receiving element 103 (FIG. 2). By this, an amount of light received by the light receiving element 103 changes, so that the detection object 106 is detected.

Parts (a) and (b) of FIG. 3 are sectional views showing optical sensors. Part (a) of FIG. 3 is the sectional view showing the optical sensor in a comparison example and shows a constitution in which there is no electronic circuit element between the light emitting element and the light receiving element. Part (b) of FIG. 3 is the sectional view showing the optical sensor in this embodiment (embodiment 1) and shows a constitution in which the electronic circuit element is disposed between the light emitting element and the light receiving element. In these figures, arrows indicated by a solid line represent an optical path along which the light emitted from the light emitting element in the perpendicular direction is guided to the light receiving element 103, Arrows indicated by a dotted line represent an optical along which the light emitted from the light emitting element 101 in the horizontal direction travels toward the light receiving element 103.

In the case where the light emitting element 101 is the LED of the vertical optical axis type, although most of the emitted light travels in the perpendicular direction, the light also travels in a direction other than the perpendicular direction. Further, although the phototransistor of the vertical optical axis type which is the light receiving element 103 has high sensitivity to the light incident thereon from the perpendicular direction, but the phototransistor also has sensitivity to the light incident thereon from a direction other than the perpendicular direction.

As shown in part (a) of FIG. 3 by the arrow of the dotted line, on the mounting surface of the substrate 104. In the case where the electronic circuit element is not disposed between the light emitting element 101 and the light receiving element 103, the light emitted from the light emitting element 101 in the horizontal direction enters the light receiving element 103 irrespective of presence or absence of the detection object 106 in the space 110.

As shown in part (b) of FIG. 3 by the arrow of the dotted line, on the mounting surface of the substrate 104, in the case where the electronic circuit element 102 is disposed between the light emitting element 101 and the light receiving element 103, the light emitted from the light emitting element 101 in the horizontal direction is blocked by the electronic circuit element 102 and thus does not enter the light receiving element 103.

An equivalent circuit and an output characteristic of the optical sensor in this embodiment will be described using FIGS. 4 and 5, respectively. FIG. 4 is a circuit view showing the equivalent circuit of the optical sensor in this embodiment. FIG. 5 is a graph showing the output characteristic of the optical sensor in this embodiment.

As shown in FIG. 4, the light emitting element 101 is the LED, an anode thereof is connected to a DC voltage source through a current-limiting resistor 111 and a cathode thereof is connected to the ground (GND). The light receiving element 103 is the phototransistor (Ptr), and a collector thereof is connected to a voltage source through a pull-up resistor 112 and an emitter thereof is connected the ground.

A voltage output portion 113 is connected to the collector of the phototransistor which is the light receiving element 103 and shows a voltage between a collector terminal and the ground. The voltage output portion 113 becomes an output L in a state in which the phototransistor is turned on, i.e., a state in which the light enters the phototransistor. On the other hand, the voltage output portion 113 becomes an output H in a state in which the phototransistor is turned off, i.e., a state in which the light does not enter the phototransistor.

In FIG. 5, an abscissa represents a current (mA) flowing through the light emitting element 101. A light emission amount of the light emitting element 101 is proportional to a current (amount) flowing through the light emitting element 101. In FIG. 5, an ordinate represents a voltage (V) of the voltage output portion 113. In this embodiment, during an experiment, a DC input voltage was 3.3 V, and the LED with a rated current of 50 mA was used. During the experiment, the LED was used with the current of 40 mA.

In FIG. 5, data indicated by a solid line show a state in which the detection object 106 is "absent (NO)" in the space 110 of the optical sensor and the electronic circuit element 102 is "present (YES)" between the light emitting element 101 and the light receiving element 103. Data indicated by a broken line show a state in which the detection object 106 is "present (YES)" in the space 110 of the optical sensor and the electronic circuit element 102 is "absent (NO)" between the light emitting element 101 and the light receiving element 103. Data indicated by a dotted line show a state in which the detection object 106 is "present (YES)" in the space 110 of the optical sensor and the electronic circuit element 102 is "present (YES)" between the light emitting element 101 and the light receiving element 103.

In the case where the detection object 106 is present in the space 110 of the optical sensor, the light from the light emitting element 101 is blocked by the detection object 106, and therefore, the light receiving element 103 is in a state in which the light does not enter the light receiving element 103, so that the voltage output portion 113 is the output H. On the other hand, in the case where the detection object 106 is absent in the space 110 of the optical sensor, the light from the light emitting element 101 is not blocked by the detection object 106, and therefore, the light receiving element 103 is in a state in which the light enters the light receiving element 103, so that the voltage output portion 113 is the output L. The optical sensor is required to produce an output depending on the presence or absence of the detection object 106 without relying on the light emission amount of the light emitting element 101.

As regards the data indicated by the solid line, of the light from the light emitting element 101, the light emitted from the light emitting element 101 in the horizontal direction is blocked by the electronic circuit element 102 between the light emitting element 101 and the light receiving element 103 (part (b) of FIG. 3). For that reason, the amount of the light received by the light receiving element 103 does not rely on the current flowing through the LED which is the light emitting element 101, i.e., on the light emission amount of the light emitting element 101, so that the output L is produced. For that reason, the optical sensor is capable of discriminating the absence ("NO") of the detection object 106.

As regards the data indicated by the broken line, not only the light from the light emitting element 101 in directly enters the light receiving element 103 by inner surface reflection of the light guide 105 but also the light emitted from the light emitting element 101 in the horizontal direction directly enters the light receiving element 103. For that reason, the amount of the light received by the light receiving element 103 depends on the current flowing through the light emitting element 101, i.e., the light emission amount of the light emitting element 101, so that the output H and the output L change. For that reason, the optical sensor is influenced by the light directly enters the light receiving element 103 from the light emitting element 101, so that the optical sensor cannot discriminate the presence or absence of the detection object 106.

As regards the data indicated by the dotted line, of the light from the light emitting element 101, the light emitted from the light emitting element 101 in the horizontal direction is blocked by the electronic circuit element 102 between the light emitting element 101 and the light receiving element 103 (part (b) of FIG. 3). For that reason, the amount of the light received by the light receiving element 103 does not rely on the current flowing through the LED which is the light emitting element 101, i.e., on the light emission amount of the light emitting element 101, so that the output H is produced. For that reason, the optical sensor is capable of discriminating the presence ("YES") of the detection object 106.

The voltage output portion 113 is connected to a logic IC, and the voltage thereof is compared with a reference voltage in the logic IC, so that the voltage is discriminated as two vales of the output H and the output L. For example, the logic IC operating with an input of 3.3 V recognizes 2.6 V or more as the output H and 0.6 V or less as the output L, so that the logic IC cannot properly recognize 0.6 V to 2.6 V as the output H or the output L.

The light emission amount of the light emitting element 101 changes depending on an ambient temperature condition and a cumulative turning-on time. In addition thereto, the light emission amount of the light emitting element 101 changes depending on variations in light emission efficiency of the light emitting element 101, optical axis, sensitivity of the light receiving element 103, inner surface reflection of the light guide 105, and the like. For that reason, there is a need to produce the output depending on the presence or absence of the detection object 106 without relying on the light emission amount of the light emitting element 101.

However, as described above, in the optical sensor, when the light directly entering the light receiving element 103 from the light emitting element 101 is present, the presence or absence of the detection object 106 in the space 110 cannot be properly discriminated (data indicated by the broken line in FIG. 5).

Therefore, it is understood that the electronic circuit element 102 is disposed between the light emitting element 101 and the light receiving element 103 and thus blocking of the light directly entering the light receiving element 103 from the light emitting element 101 by the electronic circuit element 102 is effective.

As in this embodiment, when the electronic circuit element 102 is constituted by the chip register, the electronic circuit element 102 is mounted simultaneously during mounting of the light emitting element 101 and the light receiving element 103 on the substrate 104 by an automatic mounting device which is an automatic machine, and then is capable of being passed through a reflow furnace. Further, a general-purpose chip register is available inexpensively, so that there is advantage such that various sizes are selectable. For that reason, by disposing the electronic circuit element between the light emitting element and the light receiving element on the mounting surface (same surface) of the substrate, detection of the detection object 106 can be properly carried out without being influenced by the light directly entering the light receiving element from the light emitting element, so that it is possible to provide the optical sensor with an inexpensive and simple constitution.

Further, in the constitution in which the light guide is assembled later with the substrate, there is no need to provide a mechanism for preventing the light directly entering the light receiving element from the light emitting element in the horizontal direction, and therefore, the light guide can be constituted so as to be inexpensive and simple.

Incidentally, in this embodiment, as the electronic circuit element 102, the chip register mounted on the same surface of the substrate was described as an example, but the present invention is not limited thereto. The electronic circuit element may only be required to be light-blocking component parts, which are mountably by the automatic mounting device and which can be passed through the reflow furnace, including electronic circuit elements such as a chip ceramic capacitor, chip beads, a connector, a coil, a chip jumper which are electronically connected to the light emitting element and the light receiving element, and heat-resistant component parts other than the electronic circuit elements, and so on.

Further, when the electronic circuit element 102 disposed between the light emitting element 101 and the light receiving element 103 has a constitution blocking a part between the light emitting element and the light receiving element on the mounting surface of the substrate, an effect can be obtained. However, as the electronic circuit element 102, it is preferable that a member thicker (higher) than a height of the light emitting element 101 or the light receiving element 103.

Further, also in the case where the light guide made of a transparent resin material is employed as the light guiding member, there is no need to provide the mechanism for preventing the light directly entering the light receiving element from the light emitting element in the horizontal direction. For that reason, it is possible to provide the optical sensor by the inexpensive and simple constitution.

Embodiment 2

An optical sensor according to an embodiment 2 of the present invention will be described with reference to FIGS. 6 and 7. In the embodiment 2, members (portions) similar to those in the embodiment 1 will be omitted from description. Part (a) of FIG. 6 is a perspective view of the optical sensor in this embodiment, and part (b) of FIG. 6 is a top plan view of the optical sensor in this embodiment. FIG. 7 is a schematic view showing a component part layout and a wiring pattern of the optical sensor in this embodiment.

An equivalent circuit of the optical sensor in this embodiment is the same in content as the equivalent circuit described in the embodiment 1 with reference to FIG. 4, and therefore will be omitted from description.

In the embodiment 2, an electronic circuit element disposed between the light emitting element 101 and the light receiving element 103 is a part of component parts constituting a driving circuit for driving the light emitting element 101 or the light receiving element 103. Specifically, a current-limiting resistor 111 for the light emitting element 101 and a pull-up resistor 112 for the light receiving element 103 also function as the electronic circuit element disposed between the light emitting element 101 and the light receiving element 103. As shown in FIGS. 6 and 7, on the substrate 104, in addition to the light emitting element 101, the current-limiting resistor 111, the pull-up resistor 112, and the light receiving element 103, a CPU 121 and a memory 122 are mounted on the same surface. The current-limiting resistor 111 and the pull-up resistor 112 which are the electronic circuit elements are disposed on the mounting surface (same surface) of the substrate 104 between the light emitting element 101 and the light receiving element 103. In this embodiment, the current-limiting resistor 111 and the pull-up resistor 112 function as the electronic circuit elements blocking the light directly entering the light receiving element 103 from the light emitting element 101.

Further, in this embodiment, a plurality of electronic circuit elements disposed between the light emitting element 101 and the light receiving element 103 are provided. The current-limiting resistor 111 and the pull-up resistor 112 which are the plurality of electronic circuit elements are disposed at different positions between the light emitting element 101 and the light receiving element 103. Specifically, the current-limiting resistor 111 and the pull-up resistor 112 are mounted while being shifted in position in the vertical direction of part (b) of FIG. 6. The current-limiting resistor 111 and the pull-up resistor 112 are disposed at different positions with respect to a direction crossing a line DL connecting a center of the light emitting source 101a of the light emitting element 101 and a center of the light receiving region 103a of the light receiving element 103. In this embodiment, the constitution in which the current-limiting resistor 111 and the pull-up resistor 112 are disposed at different positions with respect to the direction crossing the line DL was described as an example, but the present invention is not limited thereto. In the case where the plurality of electronic circuit elements are disposed at the different positions with respect to the direction crossing the line DL connecting the center of the light emitting source 101a of the light emitting element 101 and the center of the light receiving region 103a of the light receiving element 103, at least one electronic circuit element may only be disposed on the line DL between the light emitting element 101 and the light receiving element 103. Further, the current-limiting resistor 111 and the pull-up resistor 112 used in this embodiment are component parts smaller in size than the light emitting element 101 and the light receiving element 103. By mounting the current-limiting resistor 111 and the pull-up resistor 112 on the same surface of the substrate 104 while shifting the positions of these registers, an optical path along which the light emitted from the light emitting element 101 in the horizontal direction enters the light receiving element 103 in the horizontal direction is blocked.

As described above, a constitution in which the current-limiting resistor 111 and the pull-up resistor 112 which are component parts constituting the driving circuit for driving the light emitting element 101 and the light receiving element 103 function as the electronic circuit element disposed between the light emitting element 101 and the light receiving element 103 is employed. By this, it is possible to eliminate an increase in cost by addition of the electronic circuit elements.

Further, the current-limiting resistor 111 and the pull-up resistor 112 which are the plurality of electronic circuit elements are mounted on the same surface of the substrate 104 of the substrate 104 while shifting the positions thereof. By this even in the case where component parts smaller in size than the light emitting element 101 and the light receiving element 103 are used as the current-limiting resistor 111 and the pull-up resistor 112, it is possible to cause the current-limiting resistor 111 and the pull-up resistor 112 to function as the electronic circuit elements disposed between the light emitting element 101 and the light receiving element 103.

Embodiment 3

An optical sensor according to an embodiment 3 of the present invention will be described with reference to FIG. 8. In the embodiment 3, members (portions) similar to those in the embodiments 1 and 2 will be omitted from description. FIG. 8 is a sectional view of the optical sensor in this embodiment.

The optical sensor in the embodiment 3 is provided with a back casing 108 including reflecting surfaces 109a and 109b instead of the light guide which is the light guiding member assembled later with the substrate. In the following, this will be specifically described.

In this embodiment, on the same surface of the substrate 104, the light emitting element 101, the electronic circuit element 102 and the light receiving element 103 are mounted early, and the casing 108 is mounted on the substrate 104 later. The black casing 108 is a member prepared by integrally forming a first hollow portion 108a including a first reflecting surface 109a, a second hollow portion 108b including a second hollow portion 109b, and a connecting portion 108c connecting the first hollow portion 108a and the second hollow portion 108b. The first hollow portion 108a includes the first reflecting surface 109a for reflecting the light emitted from the light emitting element 101 and a first slit 108d for permitting passing of the light reflected by the first reflecting surface 109a toward the space 110. The second hollow portion 108b is provided opposed to the first hollow portion 108a through the space 110. The second hollow portion 108b includes a second slit 108e for receiving the light passed through the space 110 and the second reflecting surface 109b for reflecting the light passed through the second slit 108e toward the light receiving element 103.

In the case where the casing 108 including the reflecting surfaces 109a and 109b is assembled later with the substrate 104, in order to guide the light from the light emitting element 101 to the light receiving element 103, there is a need to perform proper positioning of the reflecting surfaces 109a and 109b. For that reason, in the case where the casing 108 is assembled later with the substrate 104, as shown in FIG. 8, a gap is produced between the connecting portion 108c of the casing 108 and the substrate 104. In order to assemble the casing 108 with the substrate without producing the gap, there is a need to devise a shape of the casing 108, but it is not easy. When the gap is produced between the connecting portion 108c of the casing 108 and the substrate 104, as shown in FIG. 8 by a dotted arrow, a path along which the light emitted from the light emitting element 101 in the horizontal direction passes through the gap and then directly enters the light receiving element 103 is formed.

As described above, in the optical sensor, when the light directly entering the light receiving element 103 from the light emitting element 101 exists, the presence or absence of the detection object 106 in the space 110 cannot be properly discriminated.

Therefore, in the optical sensor in this embodiment, on the mounting surface (same surface) of the substrate 104, the electronic circuit element 102 is disposed between the light emitting element 101 and the light receiving element 103. By this, it is possible to block the path of the light directly entering the light receiving element 103 from the light emitting element 101 by disposing the electronic circuit element 102.

As described above, in the constitution in which the light emitting element and the light receiving element are mounted on the same surface of the substrate and the casing is assembled later with the substrate, the electronic circuit element is mounted between the light emitting element and the light receiving element. By this, even in the case where the gap is produced between the substrate and the casing, it is possible to realize the optical sensor with no influence of stray light in an inexpensive and simple constitution.

Further, there is no need to provide the casing with a mechanism for preventing the light directly entering the light receiving element from the light emitting element, and therefore the casing can be constituted in expensively and simply.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-156386 filed on Aug. 29, 2019, which is hereby incorporated by reference herein in its entirety.

What is claimed is:

1. An optical sensor comprising:
a substrate;
a light emitting element configured to emit light;
a light receiving element configured to receive the light from said light emitting element through a space where a detection object passes; and
an electronic circuit element,
wherein the light from said light emitting element is blocked by the detection object to detect the detection object,
wherein said light emitting element, said electronic circuit element and said light receiving element are mounted on the same surface of said substrate,
wherein said electronic circuit element is disposed between said light emitting element and said light receiving element on a mounting surface of said substrate,
wherein a thickness of said electronic circuit element in a thickness direction perpendicular to the surface of said substrate is equal to or larger than a thickness of said light emitting element in the thickness direction, and
wherein said electronic circuit element includes at least one of a chip resistor, a chip ceramic capacitor, chip beads, a connector, a coil, and a chip jumper.

2. An optical sensor according to claim 1, wherein said electronic circuit element includes a plurality of electronic circuit element portions provided at different positions on the mounting surface of said substrate with respect to a direction crossing a line connecting a center of a light emitting source of said light emitting element and a center of light receiving region.

3. An optical sensor according to claim 1, further comprising:

a first light guiding portion configured to guide the light emitted from said light emitting element in a direction in which the light passes through said space;

a second light guiding portion provided opposed to said first light guiding portion through said space and configured to guide the light passed through said space to said light receiving element; and a light guiding member integrally formed with a connecting portion configured to connect said first light guiding portion and said second light guiding portion, wherein said electronic circuit element is disposed between said light emitting element and said light receiving element at a position corresponding to said connecting portion.

4. An optical sensor according to claim 1, further comprising:

a first hollow portion including a first reflecting surface configured to reflect the light emitted from said light emitting element and a first slit configured to permit passing of the light reflected by said first reflecting surface toward said space;

a second hollow portion provided opposed to said first hollow portion through said space and including a second slit configured to receive the light passed through said space and a second reflecting surface configured to reflect the light passed through said second slit toward said light receiving element; and a black casing integrally formed with a connecting portion configured to connect said first hollow portion and said second horizontal direction, wherein said electronic circuit element is disposed between said light emitting element and said light receiving element and between said substrate and said connecting portion of said casing.

5. An optical sensor according to claim 1, wherein said light emitting element includes a light emitting source configured to emit the light, wherein said light receiving element includes a light receiving region configured to receive the light, and wherein said electronic circuit element is disposed on a line connecting a center of said light emitting source of said light emitting element and a center of said light receiving region of said light receiving element.

6. An optical sensor according to claim 5, wherein said electronic circuit element is a reflow mountable element and is a portion of a component part constituting a driving circuit for driving said light emitting element or said light receiving element.

7. An optical sensor according to claim 1, wherein said light emitting element is a LED of a surface mounting type, and said light receiving element is a phototransistor of a surface mounting type.

* * * * *